INVENTORS
ROBERTO CAFISSI
AGOSTINO LUNA
BY
AGENT

United States Patent

[11] 3,588,746

[72] Inventors Agostino Luna;
Roberto Cafissi, Milan, Italy

[21] Appl. No. 813,925
[22] Filed Apr. 7, 1969
[45] Patented June 28, 1971
[73] Assignee GTE Automatic Electric Laboratories Incorporated Northlake, Ill.
[32] Priority May 31, 1968
[33] Italy
[31] 17180/68

[54] WIDEBAND SOLID STATE FREQUENCY MODULATOR WITH LINEAR CHARACTERISTICS
2 Claims, 4 Drawing Figs.

[52] U.S. Cl. .......... 332/14, 307/290, 331/113, 332/16
[51] Int. Cl. .......... H03c 3/00, H03k 3/281
[50] Field of Search .......... 332/14, 16 (T); 331/113; 307/290

[56] References Cited

UNITED STATES PATENTS

| | | | |
|---|---|---|---|
| 3,371,289 | 2/1968 | Luna et al. | 331/113X |
| 3,426,219 | 2/1969 | Cancro | 331/113 |

*Primary Examiner*—Alfred L. Brody
*Attorneys*—K. Mullerheim, B. E. Franz and Cyril A. Krenzer

ABSTRACT: A linear frequency modulator employing a high frequency transistorized multivibrator, the coupling capacitor of which is linearly charged and discharged by a pair of constant current generators, the output of one of which is varied by the modulating signal. The linearity of the modulation characteristics is improved by providing in the collector circuit of one of the multivibrator transistors a linearization network including a resistor and an inductor connected in parallel with each other and in series with a diode.

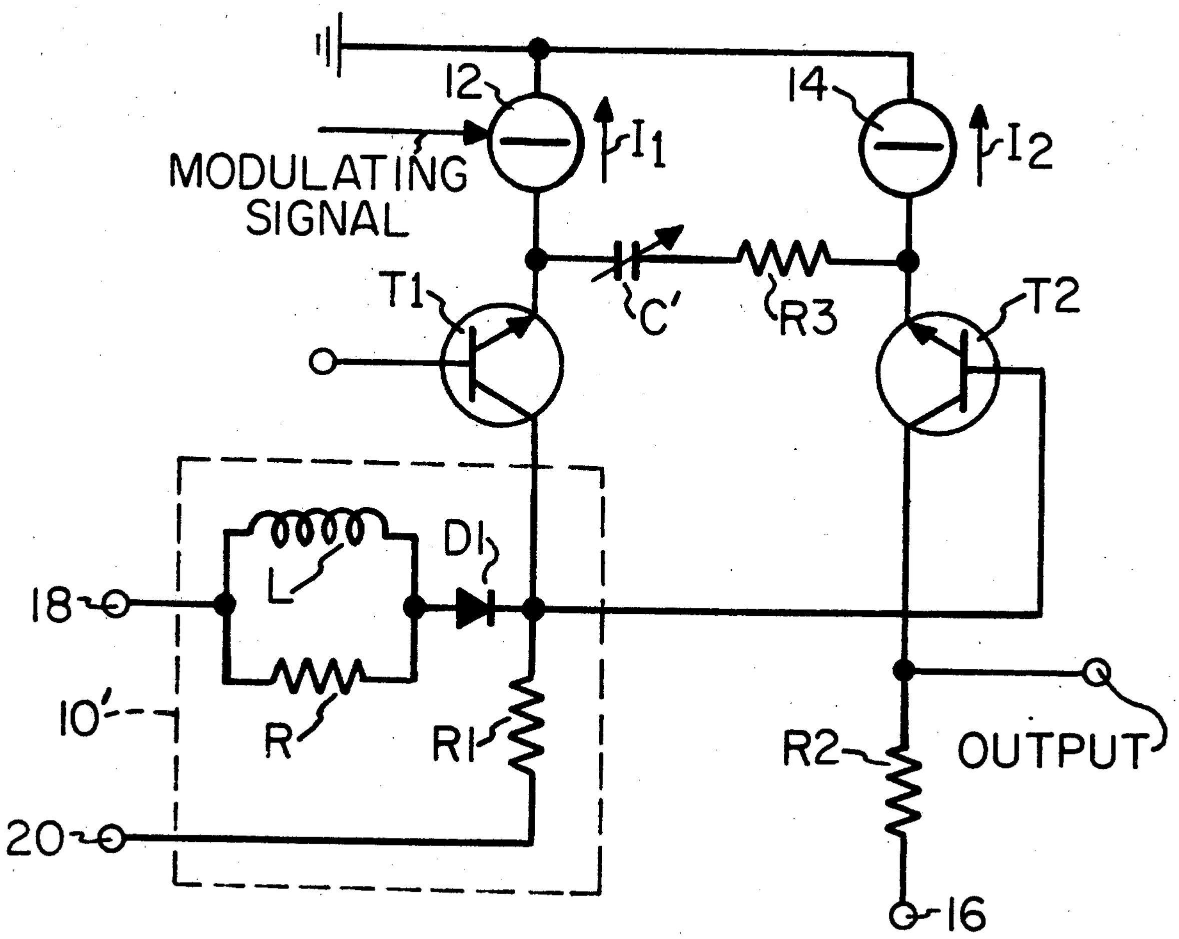

WIDEBAND SOLID STATE FREQUENCY MODULATOR WITH LINEAR CHARACTERISTICS

BACKGROUND OF THE INVENTION

This invention relates generally to radio receivers for frequency modulated waves, and more particularly to a wideband solid state frequency modulator useful in such receivers to enable reception of weak signals in the presence of excessive noise.

A receiver of the type in which the invention has particular applicability is described in U.S. Pat. No. 2,930,892, wherein demodulation is accomplished by generating a local oscillator voltage which is synchronized with the carrier contained in the received signal and frequency modulated by the demodulated output signal and applying it in negative feedback relationship to a suitable phase detector. Heretofore, this patented system has not entirely achieved its objectives, primarily because the modulation characteristics of the local oscillator were not sufficiently linear.

Significant improvement has been achieved in the performance of such receiver systems by incorporating therein wideband frequency modulators of the type shown in U.S. Pat. Nos. 3,349,343 and 3,371,289 granted to the applicants herein and assigned to the assignee of the present application. U.S. Pat. No. 3,349,343 covers a frequency modulator including a multivibrator whose modulation characteristic is made linear by using a resistor-diode circuit to determine the frequency which, in addition to determining the center frequency, changes its own characteristics with changes in frequency so as to make the modulation characteristic linear. In the modulator described in the second above-mentioned patent the objectionable recovery time characteristic of the diode as used in the circuit of the '343 patent is partially offset by connecting an additional resistor in series with a reactive circuit comprising a resistor and an inductor connected in parallel to a source of potential, and connecting a capacitor to ground from the junction of the additional resistor and the parallel RL circuit.

It has been discovered that, generally speaking, the linearization method described in U.S. Pat. No. 3,349,343 applies effectively also in the case of modulators with a symmetric multivibrator in which the modulation is impressed on both current generators. U.S. Pat. No. 3,061,799 to J. R. Biard, for example, discloses such a multivibrator. While in these multivibrators the modulation characteristic is per se linear this applies, however, only at low frequencies, up to magnitudes of the order of 20—30 MHz. since at these and higher frequencies the operation deteriorates because of the reverse recovery time of the diode, even if a diode with a high switching speed is used. In fact, in the interval during which one of the multivibrator transistors changes from its conducting to nonconducting condition, the diode, which is also conducting during this interval, exhibits a very low impedance to the current changes in the transistor, the value being related to the intrinsic differential resistance of the diode. The presence of this low impedance during the time required by the diode to reach its cutoff condition is particularly harmful inasmuch as the loop gain of the positive feedback path in the modulator, and as a result thereof the rate of switching of the multivibrator from one to the other conducting conditions, are directly affected by it.

It is desirable, therefore, to provide a frequency determining circuit capable of exhibiting a sufficiently high equivalent impedance to the rapid changes in current occurring during switching from one state to the other, but which, on the other hand, does not adversely affect the operation of the multivibrator at low frequencies.

SUMMARY OF THE INVENTION

According to the invention, the foregoing object is achieved by connecting in series relationship with the diode a two-terminal network consisting of a resistor and an inductor connected in parallel with each other, the values of the inductor and resistor being so related as to provide a high impedance during the switching transition and essentially a short circuit during the remaining oscillation period. The essential function of the diode of establishing during conduction one of the two trigger levels of the multivibrator is retained, the second level being determined by the magnitude of the potential to which the parallel RL circuit is connected.

DESCRIPTION OF THE DRAWINGS

The nature of the invention and its operation will be better understood from the following description taken in conjunction with the accompanying drawings, in which.

DETAILED DESCRIPTION OF THE DRAWINGS

Figure 1:
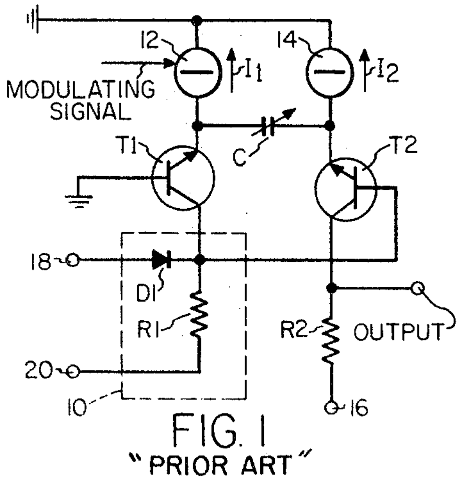
FIG. 1 is a simplified circuit diagram of a linear multivibrator according to the teachings of the aforementioned U.S. Pat. No. 3,349,343.

FIG. 1 is a simplified circuit diagram of a multivibrator of the type disclosed in the aforementioned U.S. Pat. No. 3,349,343 to which reference may be made for circuit details such as biasing networks for the various active elements of the multivibrator. Suffice it for purposes of the present invention that the frequency of switching from the conducting to the nonconducting states of transistors $T_1$ and $T_2$ is essentially established by the capacitance of capacitor C connected between the emitters of the two transistors and the linearizing circuit within the dotted enclosure 10 comprising a resistor R1 and a diode D1 and the potentials to which the latter are connected. The circles 12 and 14 represent constant current generators and are connected to the emitters of transistors T1 and T2, respectively. The magnitude of the current $I_1$ in generator 12 is varied in accordance with a modulating signal applied thereto, and the modulated output of the oscillator is taken from the collector of transistor T2 which, in turn, is connected through resistor R2 to a direct current source of operating potential, represented by terminal 16. It will be noted that the multivibrator transistors are cross-connected from the collector of transistor T1 to the base of transistor T2.

Turning now to the linearization circuit 10, the anode of diode D1 is connected to a tap, represented by terminal 18, of a voltage divider (not shown) connected between a source of positive direct current operating potential and ground, and the linearizing resistor R1 is connected between the cathode of the diode and a terminal 20, which may be another tap of higher positive potential on the aforementioned voltage divider. It will be understood, of course, that if transistors T1 and T2 are of the PNP type, rather than the NPN type shown in the drawing, the polarities of the various voltages and current sources, together with that of diode D1, will be reversed.

In operation, as the value of $I_1$ and $I_2$ increases the resistance of the linearization circuit decreases thereby causing an increase in the multivibrator frequency. The parameters of the circuit are so designed that diode D1 and transistor T1 are conductive at the same time and blocked at the same time. The sudden change in voltage, $\Delta V$, at the collector of T1 as transistor T1 switches from its nonconducting to conducting state is limited and defined by the potential difference between the collector of T1 and the potential at terminal 18 when transistor T1 is nonconducting. As was noted earlier, when transistor T1 switches from its conducting to nonconducting condition diode D1, which was also conducting, exhibits a low impedance to the current changes in the transistor which adversely affects the rate of switching of the multivibrator from one state to the other.

Figure 2:
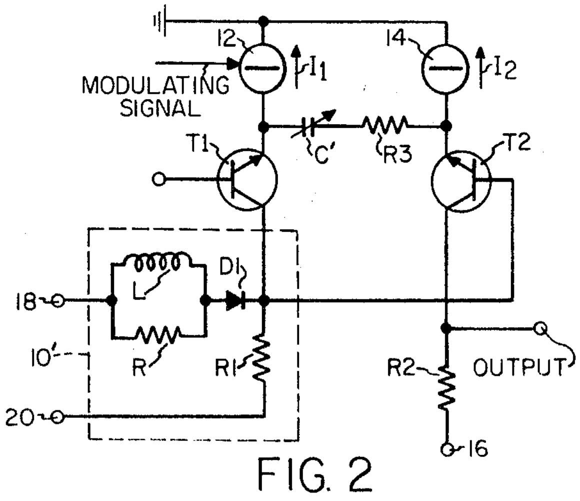
FIG. 2 is a circuit diagram of a multivibrator incorporating the linearization network of the present invention.

Referring now to FIG. 2, this problem is overcome in accordance with the present invention by connecting in series relationship with diode D1 a two-terminal circuit consisting of an inductor L and a resistor R connected in parallel with each other. Except for provision of a resistor R3 in series with timing capacitor C for damping the effects of leakage inductance present in the emitter circuit of transistors T1 and T2 during the switching period, the circuit of FIG. 2 is otherwise identical with the circuit of FIG. 1.

As fully developed in the aforementioned patents, the theoretical formula correlating the multivibrator frequency to the multivibrator parameters may be expressed as follows:

$$f=\frac{I_1 I_2}{C\Delta V(I_1+I_2)}$$

where $I_1$ and $I_2$ are the currents of the current generators 12 and 14, respectively, C is the capacitance connected between the emitters of the transistors, and $\Delta V$ is the magnitude of the voltage step between the two trigger levels of the multivibrator. When $I_1$ and $I_2$ are the same, or proportional to each other, this equation simplifies to:

$$f=\frac{1}{C\Delta V(1+k)}\cdot I_1$$

where $$k=\frac{I_2}{I_1}.$$

In a circuit which has been successfully operated the components of the circuit of FIG. 2 have the following values:

$T_1$ and $T_2$ Fairchild 2N918
D HPA 2301
C Capacitance variable, 5—18$pF$
R1 300 ohms
R2 82 ohms
R3 30 ohms
R 200 ohms
L Inductance variable, 0.15—0.2 $\mu$H.

Figure 3:
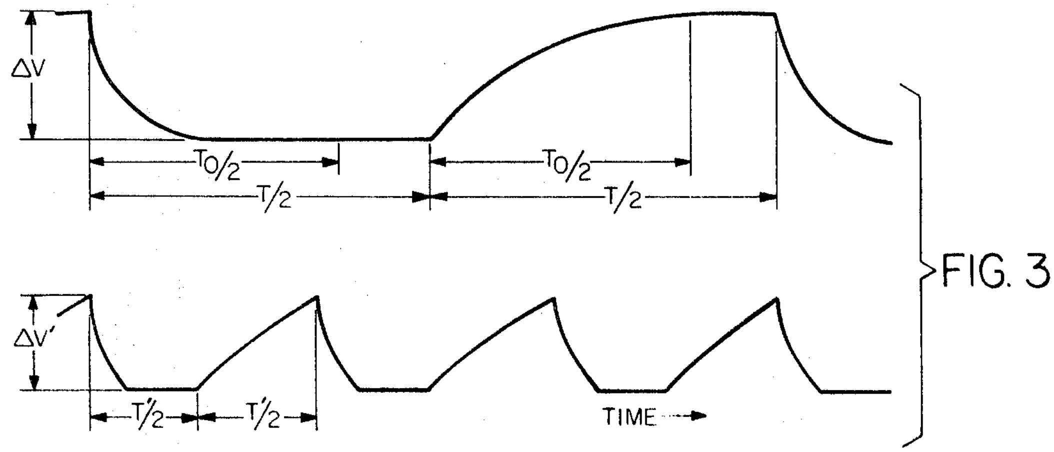
FIGS. 3 and 4 are a series of waveforms useful in explaining the operating characteristics of the modulators of FIGS. 1 and 2.
Figure 4:
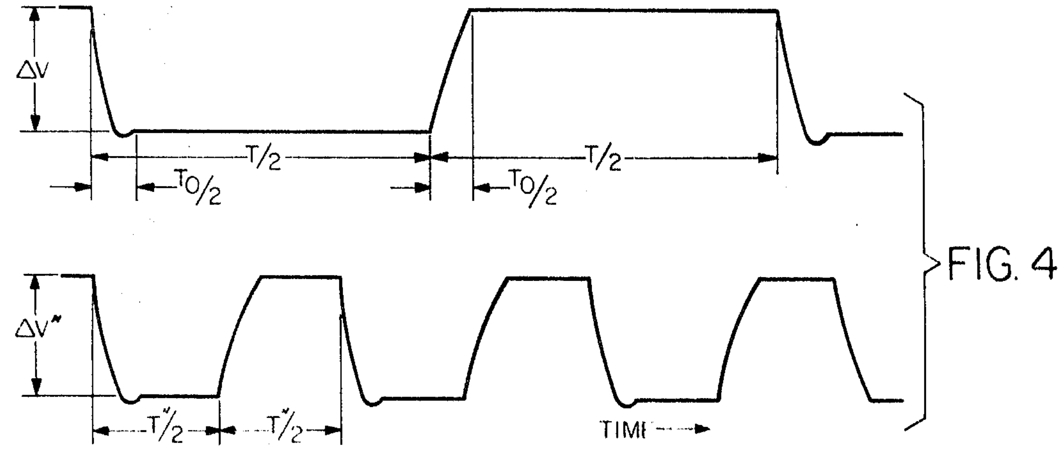

The improvement in operation achieved by the present linearization circuit over that obtainable with the circuit of FIG. 1 is graphically illustrated in FIGS. 3 and 4. FIG. 3 is a plot of voltage waveforms appearing at the collector of T1 of the circuit of FIG. 1 for two different magnitudes of current $I_1$ and $I_1'$, where $I_1'$ is much greater than $I_1$. Remembering that the frequency of the multivibrator is proportional to $I_1$, it will be noted from the curves of FIG. 3 that with changes in the period T, $\Delta V$ decreases with decreasing T (increased frequency) from a predetermined period of $T_0$.

In FIG. 4 there is plotted, for the same magnitudes of current $I_1$ and $I_1'$, curves of the voltage waveforms appearing at the collector of T1 when the linearization circuit of FIG. 2 is used. These curves demonstrate that $\Delta V$ is maintained substantially constant with changes in $I_1$, and, moreover, maintains the desired constancy even for half-periods considerably shorter than those achievable by the circuit of FIG. 1.

It has been determined that the linearity distortion in ±15 megacycle band as measured on a modulator according to the circuit of FIG. 1 and designed to operate at 70 megacycles, is greater than 30 percent, whereas when the linearization circuit of FIG. 2 is used in a modulator having the same parameters, the distortion is reduced drastically to 2 percent. Thus, the seemingly simple circuit modification according to the invention results in a remarkable improvement in performance of the modulator.

We claim:

1. A linear frequency modulator comprising: an astable multivibrator including first and second alternately conducting transistors each having base, emitter and collector electrodes, and a capacitor connected between the emitter electrodes of said first and second transistors, the frequency of oscillation of said multivibrator being dependent on the capacitance of said capacitor, the emitter current of said first transistor and the change in voltage at the collector of said first transistor when it switches from its nonconducting to its conducting state, first and second current generators respectively connected to the emitter electrodes of said first and second transistors for providing linear charging and discharging of said capacitor, said first current generator having an input terminal for receiving a modulating signal whereby the output current of said first current generator varies in accordance with the amplitude of the modulating signal, first and second sources of direct current potential, first and second resistors respectively connected between the collector electrodes of said first and second transistors and said first and second sources of potential, a third source of direct current potential of an absolute magnitude less than that of said first potential source, a diode and a parallel combination of a third resistor and an inductor, said diode being connected, in series with said parallel combination, between said third source of potential and the junction of said first resistor with the collector electrode of said first transistor and being polarized with respect to said collector electrode in the same sense as said third source of potential, said diode, said parallel combination and said first and third resistors together forming a linearization network and the values of said inductor and said third resistor being so related to each other and to the potentials of said first and third sources to cause said diode to be nonconductive when said first transistor is nonconductive and conductive when said first transistor is conductive and to exhibit a sufficiently high equivalent impedance during switching of said first transistor from one state to the other to maintain the change in voltage at the collector of said first transistor substantially constant over a range of frequency of oscillation, and an output terminal connected to the collector electrode of said second transistor.

2. The circuit according to claim 1, further including a fourth resistor connected in series with said capacitor and having a value effective to damp the effects of leakage inductance present in the emitter circuit of said first and second transistors during the switching period.